United States Patent
Mensching

[11] Patent Number: 5,571,406
[45] Date of Patent: Nov. 5, 1996

[54] ROVING BAR SCREEN

[76] Inventor: Herman E. Mensching, R.R. 3, Box 113M, Missouri Valley, Iowa 51555

[21] Appl. No.: 443,156
[22] Filed: May 17, 1995
[51] Int. Cl.$^6$ ........................................... B01D 29/64
[52] U.S. Cl. ..................... 210/159; 210/162; 210/154
[58] Field of Search .................... 210/158, 159, 210/162, 154

[56] References Cited

U.S. PATENT DOCUMENTS

| | | | |
|---|---|---|---|
| 3,549,028 | 12/1970 | Neumann et al. | 210/159 |
| 3,909,411 | 9/1975 | Angele et al. | 210/159 |
| 5,051,174 | 9/1991 | Nungaray | 210/159 |
| 5,074,996 | 12/1991 | Galanty et al. | 210/162 |
| 5,171,436 | 12/1992 | Botsch | 210/159 |

Primary Examiner—Cynthia L. Nessler
Attorney, Agent, or Firm—Law Office of John A. Beehner

[57] ABSTRACT

A laterally moveable bar rake is provided for cleaning a bar rack installed across a water stream of a water treatment facility, storm water station or the like. The device includes a traveling framework for back and forth movement across the top of the bar rack, a telescoping arm with a rake head mounted on the lower end of the telescoping arm and a tilt mechanism for tilting the telescoping arm between raking and extension position so that the arm can be extended to the bottom of the bar rack or beyond, tilted toward the bar rack and withdrawn along the bar rack to rake debris onto a discharge hopper or conveyor.

11 Claims, 9 Drawing Sheets

ROVING BAR SCREEN

BACKGROUND OF THE INVENTION

1. Technical Field

This invention is directed generally to bar screens for cleaning debris from a bar rack extended across a liquid stream such as the waste water stream entering a water treatment facility or the intake water stream for an electrical power plant. More particularly, the present invention is directed to a roving bar screen which is laterally movable across the top of a bar rack for positively cleaning and removing debris from the bar rack at different lateral positions therealong and with minimum vertical clearance requirements.

2. Description of the Prior Art

In the past, the screens for cleaning large bar racks generally required stationary equipment extending below the surface of the water under at least peak flow conditions, which equipment employed chains, cables and/or multiple rakes which were expensive and difficult to install and maintain. When the rake head of such equipment would engage too heavy of a load, the chain or cable drive system would either give out or cause the rake head to jump over the obstruction without removing it. It has been known to mount a rake on the end of a straight cylinder but that type of equipment has been limited to relatively small bar racks having a height of only approximately six feet as opposed to the 40-foot tall bar racks known for use in waste water treatment plants today.

Accordingly, a primary object of the invention is to provide an improved bar screen wherein the rake head is supported on the end of a telescoping arm mounted on a traveling framework capable of movement across the top of the bar rack for cleaning the bar rack in stages.

Another object of the invention is to provide such a roving bar screen wherein the vertical clearance requirements of the traveling framework are substantially less than the maximum extension of the telescoping arm on which the rake head is mounted.

Another object is to provide such a roving bar screen wherein the telescoping arm is designed to resist both bending and twisting forces.

A related object is to provide such a roving bar screen which is particularly adapted for indoor installation where long extension of the arm is required but ceiling height is limited.

Another object is to provide such a roving bar screen wherein the telescoping arm is actuated by a multi-stage hydraulic cylinder for positive extension and retraction even upon encountering heavy loads.

Another object of the invention is to provide such a roving bar screen with no moving parts located permanently below the surface of the water under peak flow conditions.

Another object of the invention is to provide such a roving bar screen designed to insure that maintenance can be provided at the operating floor level of the traveling framework.

Another object is to provide such a roving bar screen which is capable of both manual and automatic operation.

Another object is to provide such a roving bar screen wherein the framework and functional assemblies, both fixed and moving, are designed to provide maximum efficiency and long life.

SUMMARY OF THE INVENTION

The laterally movable bar rake of the present invention is designed to positively clean and remove debris from the upstream front side of a bar rack disposed across a liquid stream. The bar rake includes a traveling framework, and means for supporting the traveling framework adjacent the top of a bar rack for lateral movement back and forth across the top of the bar rack. A telescoping arm is mounted on the traveling framework and has a rake head secured to the lower end of the arm for raking debris from the bar rack. The telescoping arm is pivotally supported on the traveling framework for pivotal movement of the arm between a raking position wherein the rake head is positioned in raking relation to the bar rack and an extension position wherein the rake head is positioned in clearance relation from the bar rack for extension of the rake head past debris accumulated on the bar rack. A telescoping means such as a double-acting multiple stage hydraulic cylinder extends and retracts the telescoping arm between an extended position wherein the rake head is situated adjacent the bottom edge of the bar rack and a retracted position wherein the rake head is positioned adjacent the top edge of the bar rack. A tilt means such as a hydraulic cylinder is interposed between the telescoping arm and traveling framework for tilting the telescoping arm between the raking and extension positions. In addition to the arm and rake removing debris from the bar rack, it shall be capable of reaching an additional ten feet in front of the bottom of the bar rack for the purpose of removing grit and debris that may have settled there. This mode of operation would be performed on manual operation only. The traveling framework further includes a screenings collection means for receiving debris raked from the bar rack by the rake head upon retraction of the telescoping arm to its retracted position. Finally, a drive means is provided for laterally moving the traveling framework on the support means for laterally repositioning the rake head at various lateral positions along the bar rack for cleaning the bar rack in stages.

It is preferred that the multi-stage hydraulic cylinder be mounted within the telescoping arm and that the arm is designed to include a plurality of straight sided telescoping boom sections to resist both twisting and bending of the combination telescoping arm and cylinder. Likewise, the main boom section may be pivotally connected to the traveling framework at an intermediate position along the traveling boom section so that the vertical clearance requirement above the traveling framework is only a fraction of the length of the main boom section.

The support means for the traveling framework may be a pair of rails for engaging rollers on the traveling framework. The screenings collection means on the traveling framework may be a laterally extended conveyor operative to automatically discharge the collected screenings upon return of the traveling framework to a home position at one side of the bar rack. In the alternative, a continuous stationary conveyor may be mounted in front of the traveling framework, which conveyor may be operating during the entire raking cycles of the roving bar screen. The stationary conveyor may be continuous running or stopped during the raking cycles.

DESCRIPTION OF THE PREFERRED EMBODIMENT

Figure 1:
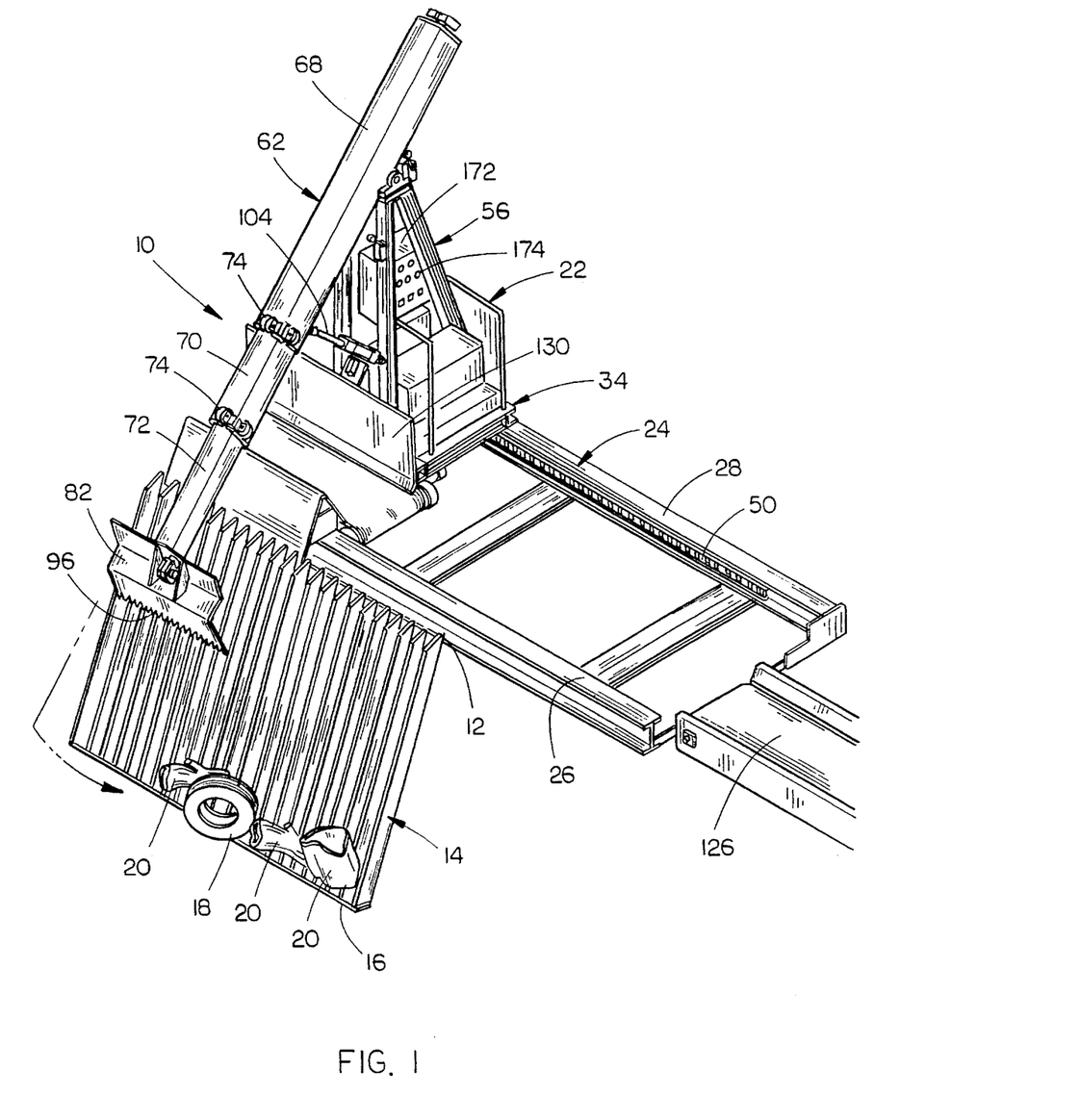
FIG. 1 is a perspective view of the roving bar screen of the invention as installed across a waste water stream with debris being screened by the bar rack.

The roving bar screen 10 of the present invention is illustrated in FIG. 1. Installed along the top edge 12 of a bar rack 14 having a bottom edge 16 engaging the bottom of a water stream flowing through the bar rack so that debris such as tire 18 and logs 20 are screened out of the water stream and engaged against the upstream front side of the bar rack 14. The bar rack 14 generally comprises a plurality of upright laterally spaced apart plates oriented to cause minimal obstruction of the water flow yet strong enough to screen out the largest articles that may be encountered in the stream. Such bar racks 14 are typically installed across the waste water stream entering a water treatment facility, storm water stations, drainage station, or across the water intake of an electric power plant, for example.

Figure 6:
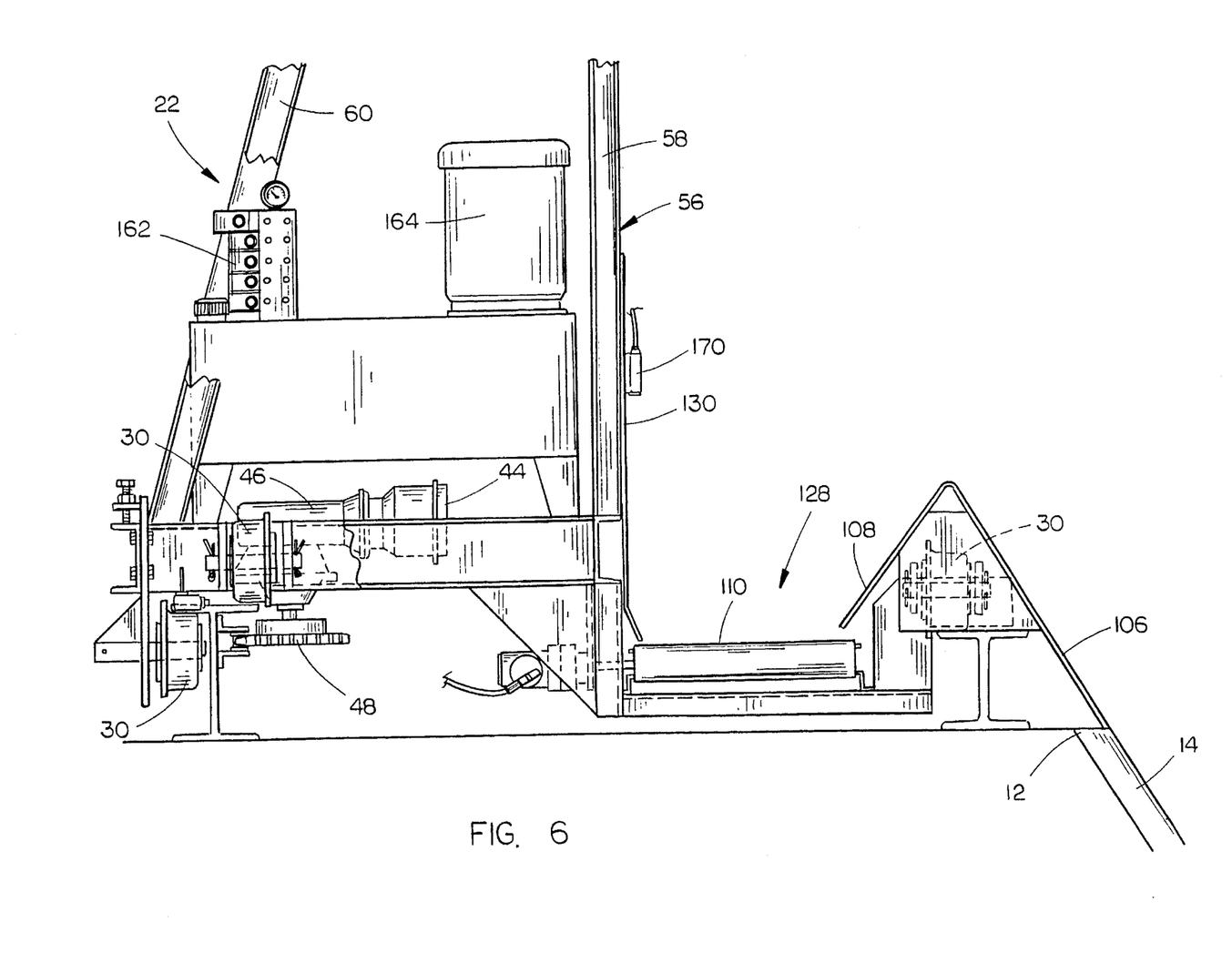
FIG. 6 is a partial side elevational view illustrating the drive mechanism for moving the traveling framework along the support rails.
Figure 7:
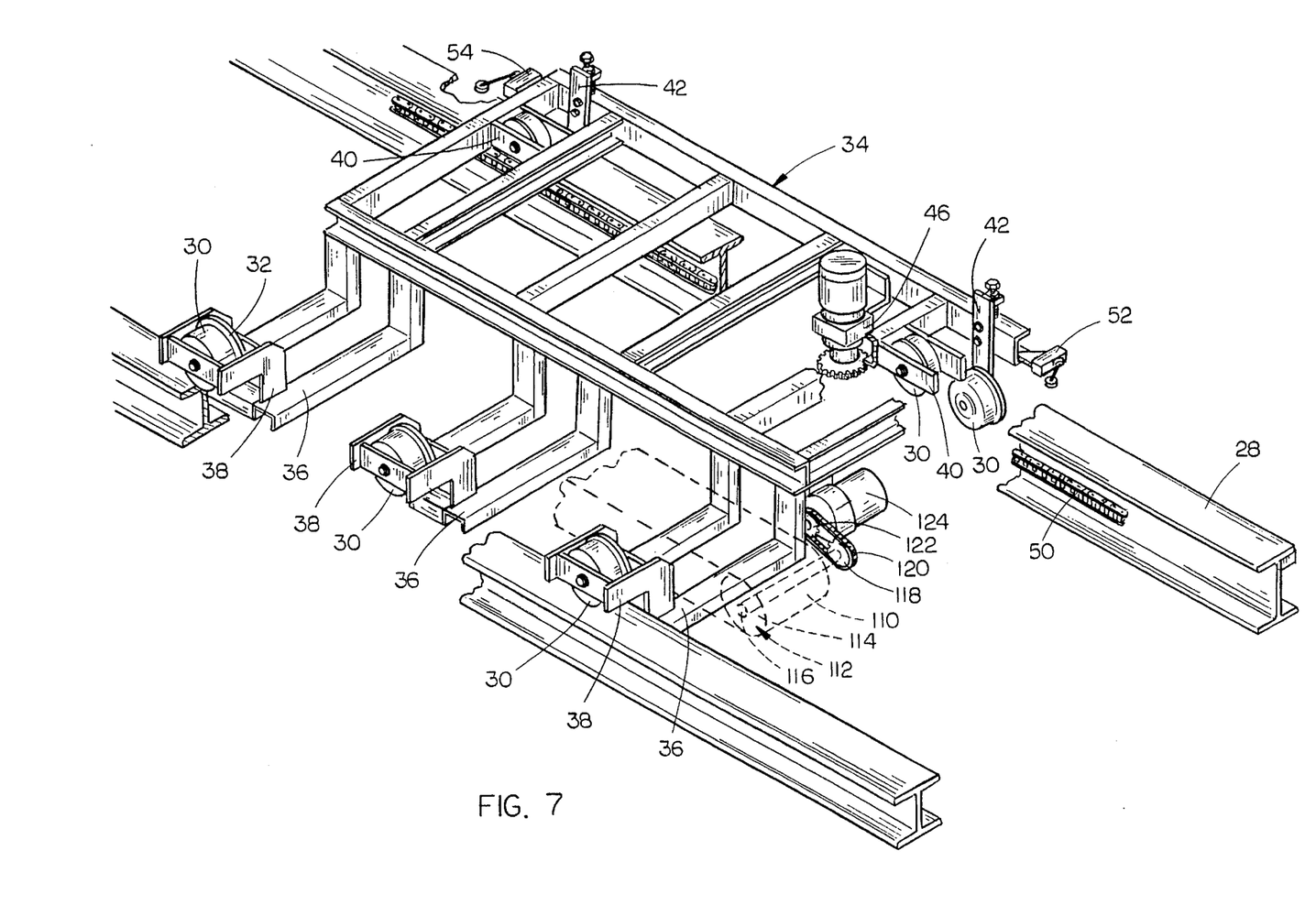
FIG. 7 is a partial perspective view further illustrating the drive mechanism for moving the traveling framework along the support rails.

The traveling framework 22 is movably supported adjacent the top edge 12 of bar rack 14 by a support means 24 such as the pair of front and rear rails 26 and 28 shown best in FIGS. 1, 6 and 7. In the illustrated embodiment, the rails are I-beams. The traveling framework 22 is supported on the rails by a series of rollers 30, each of which preferably has an interior flange 32 for engaging the interior side of the rail to maintain the traveling framework on track.

The traveling framework 22 is illustrated in FIG. 7 as including a horizontal main frame 34 with a plurality of forwardly projecting L-shaped legs 36 having the rollers 30 supported at the forward ends thereof by appropriate brackets 38. Other rollers 30 are mounted at rearward positions on the main frame 34 by appropriate brackets 40 for riding on the top flange of rear rail 28. Two other rollers 30 are mounted on the rear rail of the main frame 34 by appropriate brackets 42 for engaging the underside of the top flange of rear rail 28 to prevent tipping of the main frame 34 when screening large heavy objects.

To drive the traveling framework 22 along the rails, the framework has a hydraulic or electric brake motor 44 (FIG. 6) supported thereon and connected by a gear reducer 46 to a depending drive gear 48 in meshed engagement with the chain of roller track 50 (FIGS. 6 and 7) such that the traveling framework 22 is moved along the rails in response to rotation of drive gear 48 by brake motor 44. The drive mechanism is preferably capable of propelling the traveling framework at a nominal 25 feet per minute rate. Right and left limit switches 52 and 54 are mounted on the traveling framework 22 for engaging structure at opposite ends of the rails to either reverse or disable the brake motor 44 at the opposite ends of travel for the framework.

The traveling framework 22 includes an upstanding generally A-frame tower 56 including upright front posts 58 (FIGS. 1–3) and inclined rear posts 60. A telescoping arm 62 is pivotally connected to the top of the A-frame tower 56 by suitable bearings such as the pillow block bearings 64 illustrated in the drawings which engage aligned stub shafts 66 protruding from opposite sides of the telescoping arm. Telescoping arm 62 is extendable and retractable between the fully extended dotted line position shown in FIG. 3 and the retracted solid line position in that same figure.

Telescoping arm 62 preferably comprises a plurality of straight sided tubular booms such as the square section booms shown in FIGS. 2, 4, 5A and 5B. In the illustrated embodiment, the main boom 68 includes a 58" long section of 7" square tubing having a 0.187 inch side wall. The illustrated intermediate boom 70 is formed of 6" square tubing with a 0.18 inch wall thickness. Finally, the end boom 72 is formed of 5" square tubing with a ⅛ inch wall thickness.

Figure 4:
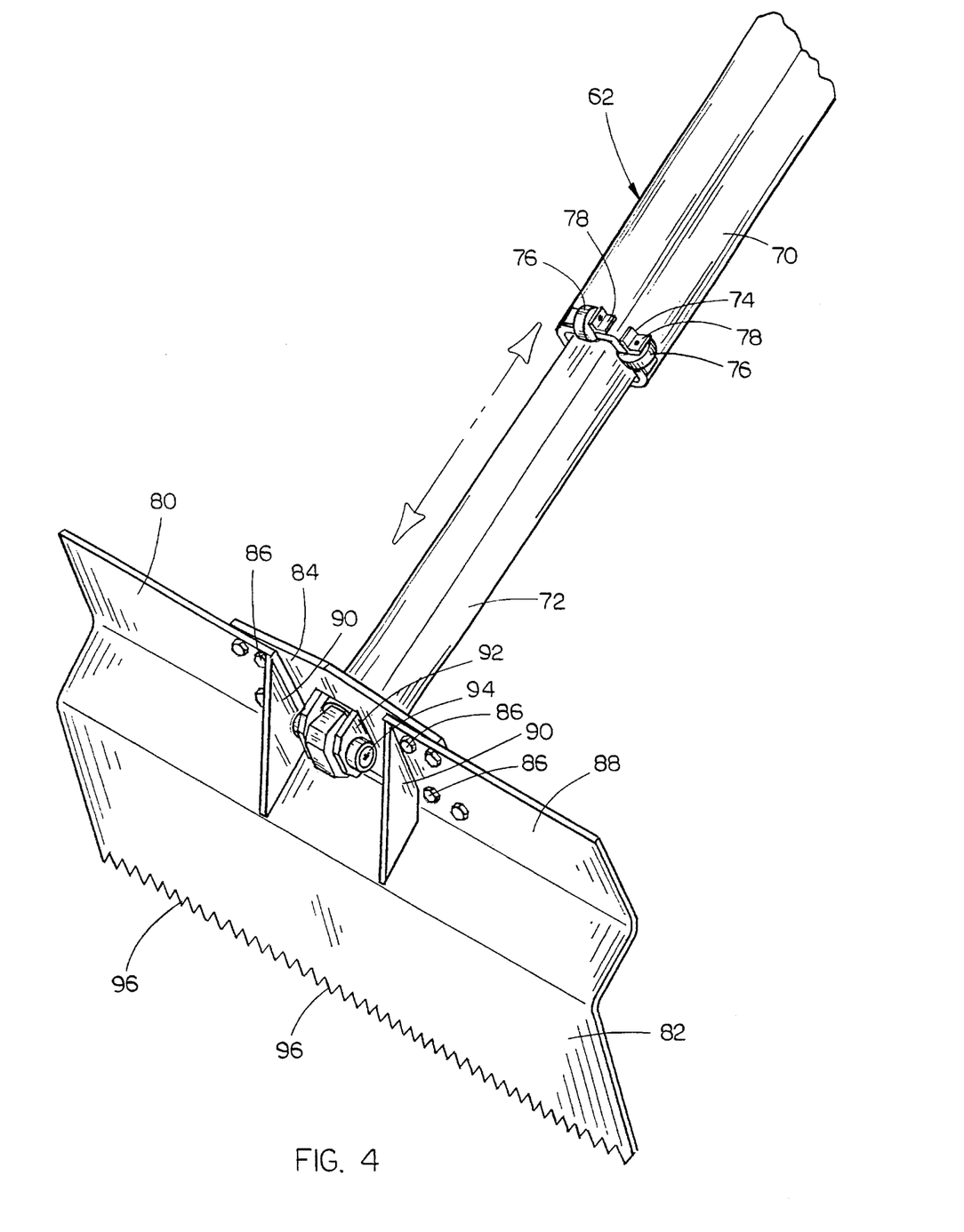
FIG. 4 is an enlarged perspective view of the rake head of the invention.
Figure 5A:
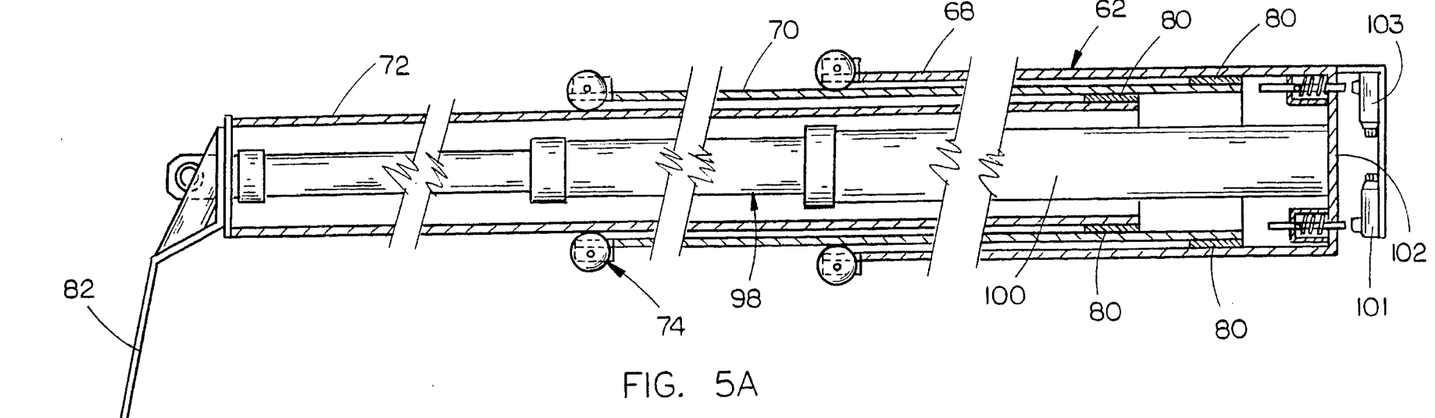
FIG. 5A is a foreshortened side sectional view of the telescoping arm in a partially extended position.
Figure 5B:
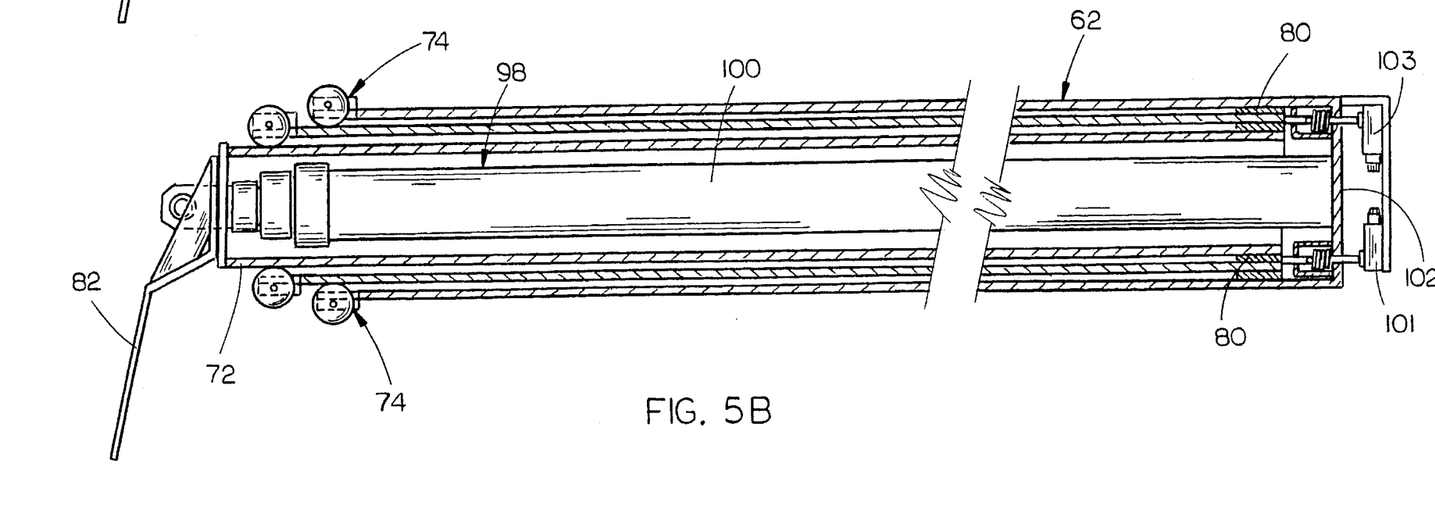
FIG. 5B is a foreshortened side sectional view of the telescoping arm in a fully retracted position.

Telescoping movement of one boom relative to the other is enabled either by a series of flat polymer bearing pads on both ends of each boom section or by a combination of roller blocks 74 and flat bearing pads 80 as shown in the illustrated embodiment. FIG. 5A shows roller blocks 74 mounted on the free ends of all but the end boom 72. FIG. 4 illustrates a typical roller block as including a roller 76 mounted on a shaft extended between a pair of L-shaped brackets 78. The roller blocks are mounted on all four sides of each tube to provide rolling support and engagement with the next inner tube. These rollers cooperate with the flat bearing pads 80 on the inner ends of all but the main boom 68 to prevent bending of the telescoping arm 62 in any extended position of it. As mentioned above, the roller blocks could be replaced with additional flat bearing pads. Likewise, the close engagement of the boom sections, one within the other, in cooperation with the straight side edges of the square section tubing, also serves to prevent twisting of the telescoping arm.

A somewhat S-shaped rake head is secured to the outer end of the end boom 72 as shown in FIG. 4. A rake attachment plate 84 is connected by bolts 86 to spaced apart upper flanges 88 of rake head 82, which flanges are reinforced by rake gussets 90. The rake attachment plate 84 is fixed by welding or the like on the end of the end boom 72 and has a cylinder clevis 92 extended outwardly from a central opening for connection by pin 94 to the hydraulic cylinder that actuates the telescoping arm, as described below. The rake head can be of any desired length but a length of between five feet and ten feet is preferred for efficient cleaning of the bar rack. The illustrated rake head is formed with ⅜" steel plate and is approximately five feet wide and 14 inches deep. The bottom edge of the rake head 82 is provided with a series of teeth 96 spaced for insertion between the upright plates of bar rack 14 for movement in a combing action upwardly along the bar rack.

Figure 9:
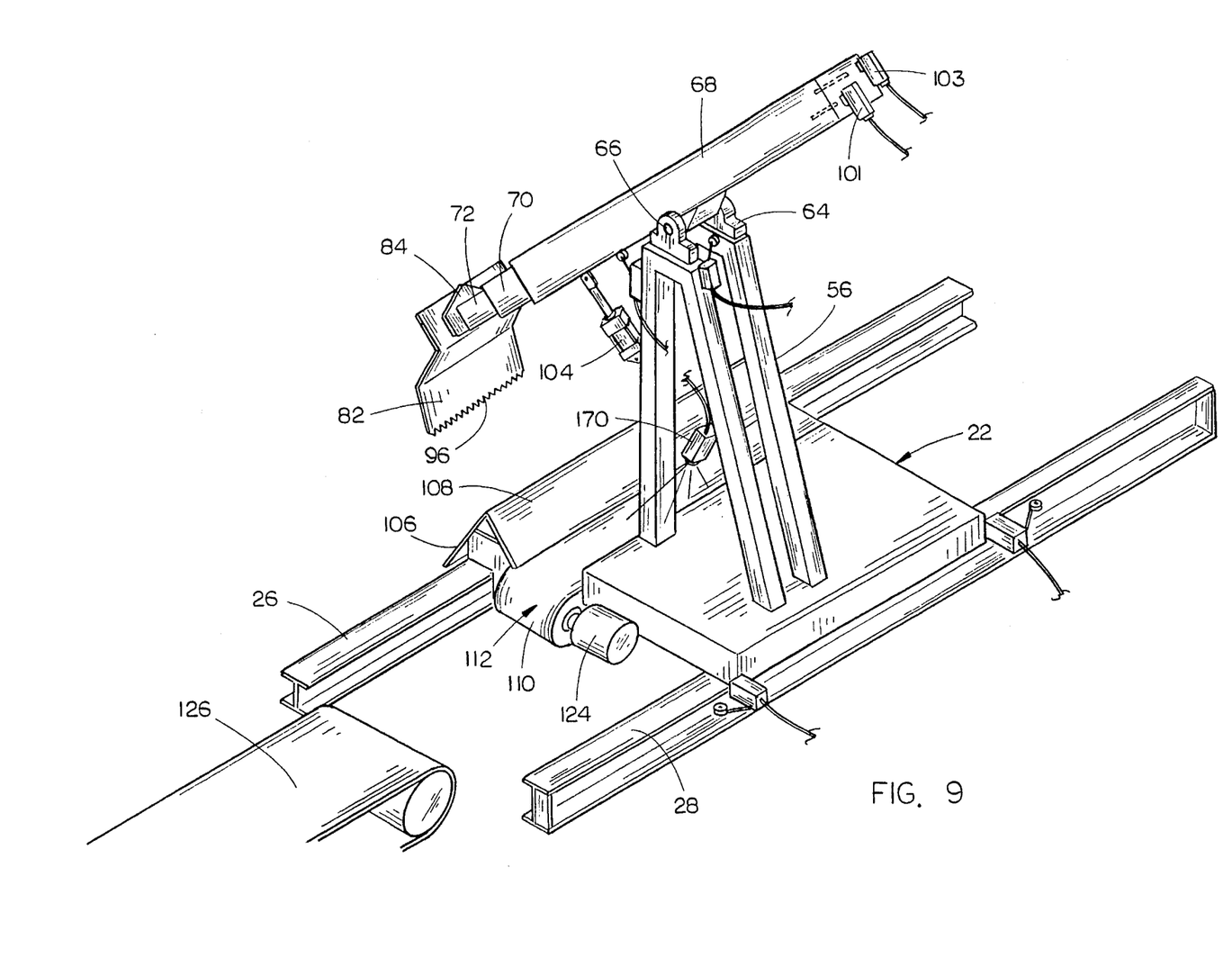
FIG. 9 is a partial perspective view illustrating the various electrical switches for enabling automatic operation of the bar screen of the invention.

The telescoping arm 62 is extended and retracted by a preferably internally mounted double-acting multiple stage cylinder 98. The outermost main cylinder 100 of hydraulic cylinder 98 is secured to the end plate 102 of main boom 68 and the opposite free end of hydraulic cylinder 98 is connected to the cylinder clevis 92 on rake head 82. The size and number of stages of hydraulic cylinder 98 are chosen to accommodate expected loads of the telescoping arm 62. It is preferred that the hydraulic cylinder 98 be able to impart a minimum force of 500 lbs. to the rake head 82. A pair of limit switches 101 and 103 (FIGS. 5A, 5B and 9) sense the retraction of telescoping arm 62. Each are actuated by spring biased pins 105 which are moved against the limit switches against the urging of the pin springs by the telescoping arm at times. Full extension of the arm is signaled by a pressure switch. Both switches 101 and 103 are engaged by their respective pins when the telescoping arm is fully retracted.

Figure 2:
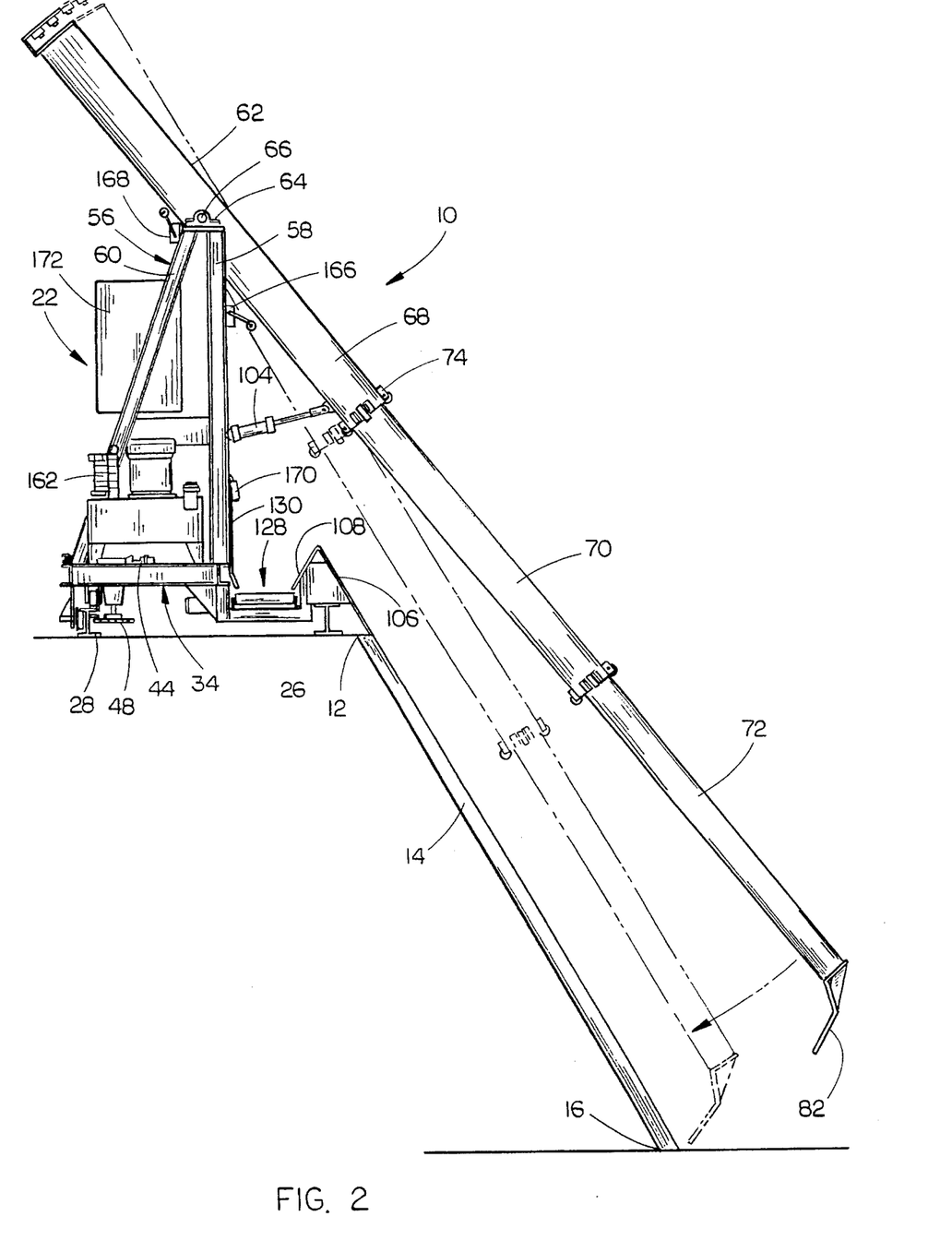
FIG. 2 is a side elevational view showing the telescoping arm fully extended and pivoted by the tilting mechanism for reaching around debris collected against the bar rack.

Referring to FIG. 2, tilting movement of telescoping arm 62 is controlled by a tilt means such as tilt cylinder 104 which is preferably a hydraulic cylinder for strong positive control of the angle of the telescoping arm 62. Tilt cylinder 104 is pivotally connected to and extended between the A-frame tower 56 on traveling framework 22 and main boom 68, preferably adjacent its lowermost end. This position is not critical but is preferred for the additional stability imparted to the telescoping arm. Actuation of tilt cylinder 104 controls the angle of telescoping arm 62 throughout its cycle of operation as described herein below.

Figure 3:
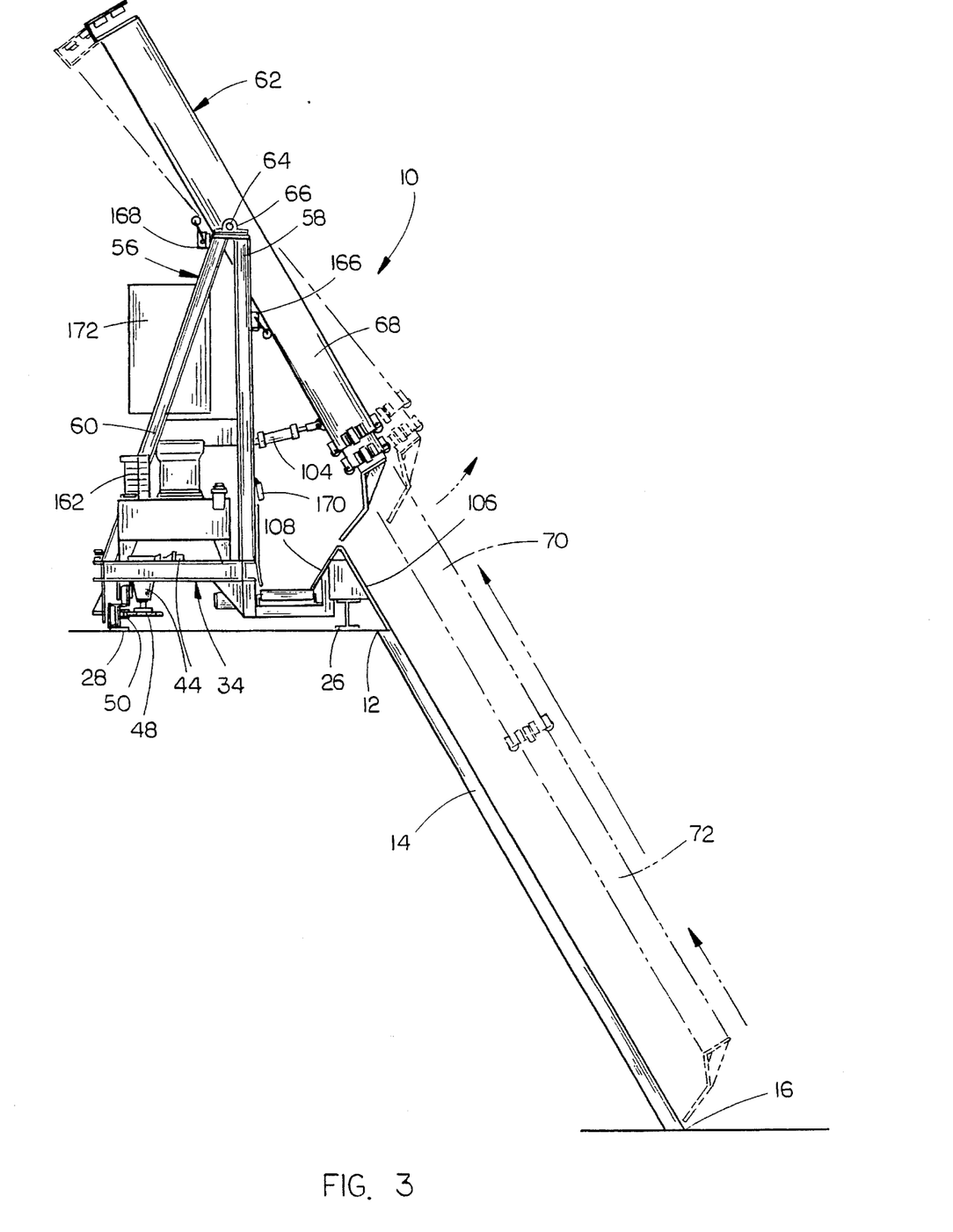
FIG. 3 is a another side elevational view illustrating return travel of the telescoping arm for collecting debris and tilting of the arm to begin a new cycle.

As the rake head 82 is combed upwardly across the bar rack 14 from the dotted line position to the solid line position in FIG. 3, debris is carried upwardly past the top edge 12 of the bar rack 14 over an inverted V-shaped beaching apron 106 which covers the front rollers of the traveling framework 22. Debris slides down the rearwardly tapered rear plate 108 of the apron onto the laterally extended belt 110 of a discharge conveyor 112 illustrated in FIGS. 7 and 9 or alternatively into a hopper at that position. Belt 110 is trained around end rollers 114, one of which is connected by axle 116 (FIG. 7) to a driven gear 118 which is connected by a chain 120 to the drive sprocket 122 on hydraulic conveyor motor 124 rigidly mounted on the underside of traveling framework 22.

Referring to FIG. 1, when the traveling framework 22 is advanced to its rightmost limit position, the discharge conveyor 112 is arranged adjacent and in alignment with a stationary conveyor 126 for discharging debris from the screenings hopper 128 formed by the beaching apron 106, discharge conveyor 112 and guard plate 130 on A-frame tower 56.

Figure 8:
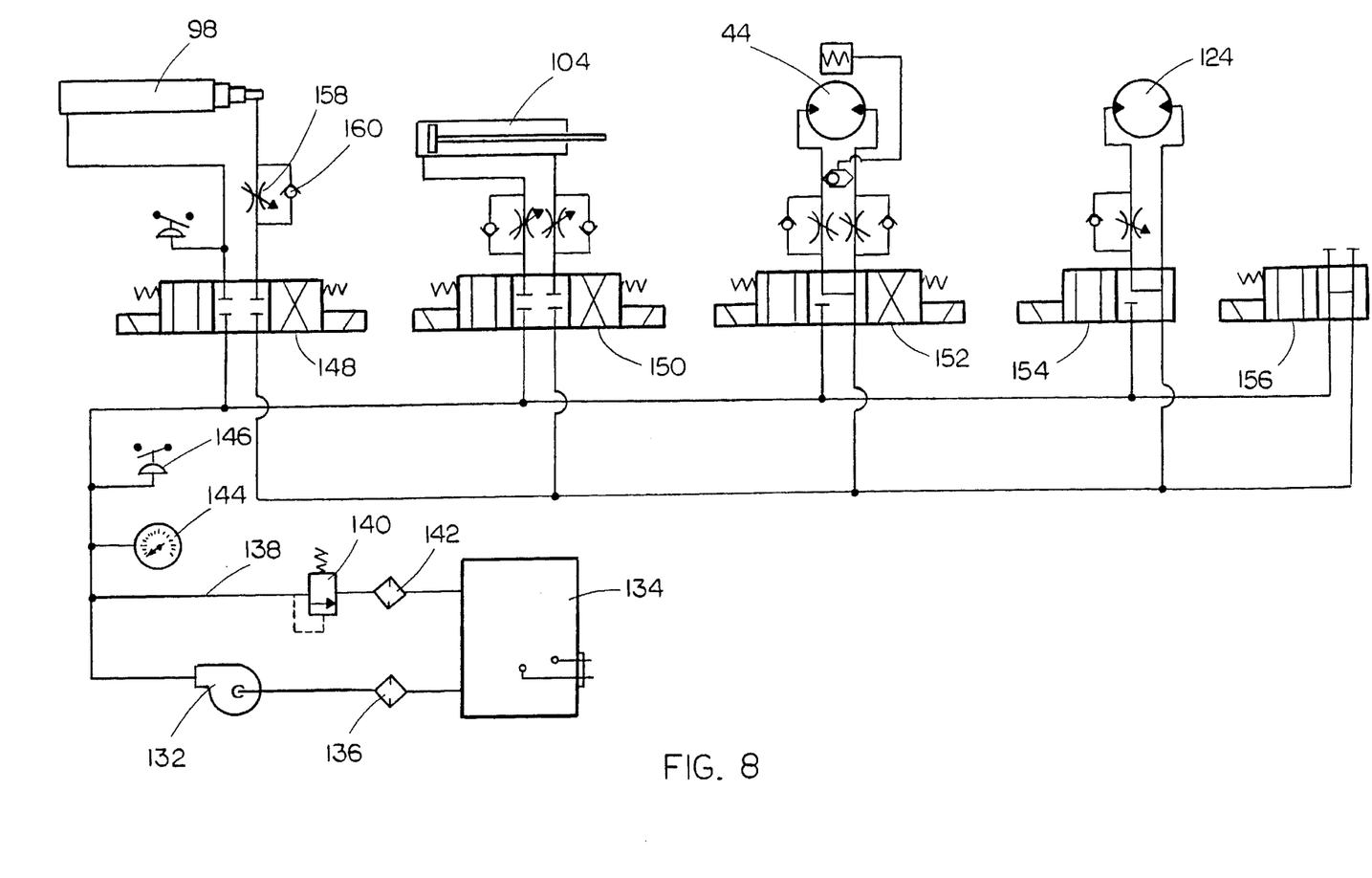
FIG. 8 is a schematic hydraulic circuit diagram for the roving bar screen of the invention.

In the preferred embodiment, the various drives for the telescoping arm, tilt mechanism, traveling framework and discharge conveyor are preferably all hydraulic and interconnected in a hydraulic circuit as illustrated in the schematic hydraulic circuit diagram of FIG. 8. The system is pressurized by a pump 132 which draws fluid from reservoir 134 through filter 136 the outlet of pump 132 is connected by return line 138, equipped with relief valve 140 and filter 142, to the reservoir to control system pressure. The fluid to the system is directed through pressure meter 144 and flowmeter 146 to one port of each of the respective solenoid-actuated valves 148–156. The three-stage solenoid valve 148 controls the double acting telescoping cylinder 98 of telescoping arm 62 with an appropriate adjustable flow control valve 158 and stop valve or ball valve 160 as illustrated. Similarly, solenoid valve 150 controls the actuation of double acting tilt cylinder 104. Solenoid valve 152 controls the actuation of reversible roving brake motor 44 and solenoid valve 154 actuates the reversible conveyor motor 124. Dump valve 156 completes the hydraulic circuit. The various control valves are mounted on a control valve block 162 shown in FIGS. 2 and 6.

In the illustrated embodiment, the hydraulic power unit includes an electric motor 164 (FIG. 6) which is specified as (230/460) 3 phase, 60 hertz, 1800 RPM. A hydraulic pump 132 preferably delivers the required gallons/minute at 1500 psi. Reservoir 134 may be a 20-gallon reservoir.

The control system for the invention provides for complete automatic and manual operation of the roving bar screen 10. Controls for both modes of operation are housed in the control panel 172 shown in FIGS. 1 and 2. FIG. 1 illustrates the manual switches 174 for operating each of the movable functions of the roving bar screen.

The traveling framework 22 is initially positioned at one end of the support rails 24. When water rises in the wet well surrounding bar rack 14 to a predetermined set point, a float switch or sonic sensor (not shown) will initiate control power in the automatic mode. The roving bar screen 10 will initiate the cleaning cycle at its parked end position. At the beginning of a cycle, the telescoping arm 62 is pivoted to the raised dotted line extension position in FIG. 3, as sensed by the tilt limit switch 168. The telescoping arm 62 is then fully extended to the solid line extended position in FIG. 2 so that the rake head 82 is moved in clearance relation over and past any debris collected against the bar rack 14. It is preferred that the rake head clear the bar rack by a minimum of 3'9" at the fully extended position. The tilt cylinder 104 is then actuated to tilt the telescoping arm to the dotted line raking position in FIG. 2, as sensed by tilt limit switch 166, whereupon the multi-stage hydraulic cylinder 98 within telescoping arm 62 retracts the rake head 82 upwardly along the bar rack 14 to the fully retracted solid line position in FIG. 3. At that position, any collected debris slides downwardly onto discharge conveyor 112 of screenings hopper 128. Unless the screenings hopper is full as detected by a sensor such as the ultrasonic screenings detector 170, brake motor 44 will be actuated to advance the traveling framework 22 along rails 24 by a distance approximately equal to the width of the rake head 82. The brake motor 44 then stops the traveling framework 22 at that next position whereupon the raking cycle is repeated. After the entire bar rack is cleaned, the traveling framework 22 will proceed back to the opposite end of the rails 24 and discharge the load of screenings from the discharge conveyor 112 onto the stationary conveyor 126. The traveling framework 22 will then again proceed to the starting point and park.

During the cycle of cleaning, if the screenings hopper 128 is filled to a predetermined set point, as detected by sensor 170, the telescoping arm will be withdrawn to the fully retracted position whereupon the traveling framework 22 will proceed to the end of the rails 24 and discharge the load of screenings, after which the traveling framework 22 will return to the next station and proceed to clean the remainder of the bar rack 14. After the final discharge of screenings, the control system will cause the traveling framework 22 to park or continue a new cycle if called for by the water level sensor or the like.

Whereas the invention has been shown and described in connection with a preferred embodiment thereof, it is understood that many modifications, substitutions and additions may be made which are within the intended broad scope of the appended claims. For example, the size of the overall unit can be tailored to fit any given job site and the size and power requirements for the telescoping arm, rake head and various motors may likewise be adjusted according to the environment in which the roving bar screen is to be installed. Whereas hydraulic motors are preferred for positive and efficient control, electrical or mechanical drive systems could be substituted if preferred. Whereas the rail support system is preferred for durability, any substitute guidance system for a traveling framework could be used. The roving bar screen as shown and described is believed to accomplish all of the stated objects.

I claim:

1. A laterally moveable bar screen operative to positively clean and remove debris from the upstream front side of a bar rack disposed across a liquid stream, said bar screen comprising, a traveling framework, support means for supporting said traveling framework, said support means being fixedly attached to at least one side of said liquid stream and adjacent the top of a bar rack for lateral movement back and forth across the top of said bar rack, a telescoping arm having a top end and an extendable lower end, a rake head mounted on said lower end of the telescoping arm for raking debris from said bar rack at times, pivotal support means for supporting said telescoping arm on said traveling framework for pivotal movement of said arm between a raking position wherein said rake head is positioned in raking relation to said bar rack and an extension position wherein said rake head is positioned in clearance relation from said bar rack for extending past debris accumulated thereon, telescoping means for extending and retracting said telescoping arm between an extended position wherein said rake head is situated adjacent the bottom edge of said bar rack and a retracted position wherein said rake head is positioned adjacent the top edge of said bar rack, tilt means for pivoting said telescoping arm between said raking and extension positions, screening collection means associated with said traveling frame work for receiving debris raked from said bar rack by said rake head upon retraction of said telescoping arm to the retracted position, and drive means for laterally moving said traveling framework on said support means for laterally repositioning said rake head relative to said bar rack.

2. The laterally movable bar screen of claim 1 wherein said support means comprises a pair of rails mounted in spaced apart relation generally parallel to the top edge of the bar rack, said traveling framework including a plurality of rollers in rolling engagement with said rails and wherein said drive means is operative to cause lateral rolling movement of said traveling framework on said rails.

3. The laterally movable bar screen of claim 1 further comprising travel control means operatively associated with said traveling framework for sensing movement of said framework to each of opposite limit positions of travel and for actuating said drive means to prevent lateral movement past said limit positions.

4. The laterally movable bar screen of claim 3 wherein said drive means comprises a drive motor on said traveling framework and coacting gear means on said motor and one rail for laterally moving said framework in response to rotation of said gear means by said drive motor.

5. The laterally movable bar screen of claim 1 wherein said telescoping arm includes a plurality of telescoping boom sections including a main boom section pivotally supported on said framework by said pivotal support means and in outermost end boom section telescopically received within said main boom section, and means for limiting rotational movement of said outermost boom section relative to said main boom section along the axis of said telescoping arm.

6. The laterally movable bar screen of claim 5 wherein said telescoping means comprises a double-acting multiple stage cylinder having opposite ends connected to said main boom section and end boom section for extending and retracting said telescoping arm.

7. The laterally movable bar screen of claim 1 wherein said tilt means comprises a fluid actuated cylinder connected to and extended between said traveling framework and telescoping arm.

8. The laterally movable bar screen of claim 1 wherein said screenings collection means comprises a hopper situated adjacent the front of said traveling framework for receiving debris raked from said bar rack upon retraction of said telescoping arm with said rake head in the raking position thereof.

9. The laterally movable bar screen of claim 8 wherein said screenings hopper includes a discharge conveyor.

10. The laterally movable bar screen of claim 9 further comprising discharge control means operative to operate said discharge conveyor in response to movement of said traveling framework to one limit position.

11. A system comprising, a bar rack disposed across a liquid stream and having an upstream front side, and a laterally moveable bar screen operative to positively clean and remove debris from the upstream front side of said bar rack disposed across a liquid stream, said bar screen comprising, a traveling framework, support means for supporting said traveling framework, said support means being fixedly attached to at least one side of said liquid stream and adjacent the top of said bar rack for lateral movement back and forth across the top of said bar rack, a telescoping arm having a top end and an extendable lower end, a rake head mounted on said lower end of the telescoping arm for raking debris from said bar rack at times, pivotal support means for supporting said telescoping arm on said traveling framework for pivotal movement of said arm between a raking position wherein said rake head is positioned in raking relation to said bar rack and an extension position wherein said rake head is positioned in clearance relation from said bar rack for extending past debris accumulated thereon, telescoping means for extending and retracting said telescoping arm between an extended position wherein said rake head is situated adjacent the bottom edge of said bar rack and a retracted position wherein said rake head is positioned adjacent the top edge of said bar rack, tilt means for pivoting said telescoping arm between said raking and extension positions, screening collection means associated with said traveling frame work for receiving debris raked from said bar rack by said rake head upon retraction of said telescoping arm to the retracted position, and drive means for laterally moving said traveling framework on said support means for laterally repositioning said rake head relative to said bar rack.

* * * * *